(No Model.) 2 Sheets—Sheet 1.
F. R. SMITH.
FISHERMAN'S REEL.
No. 259,935. Patented June 20, 1882.
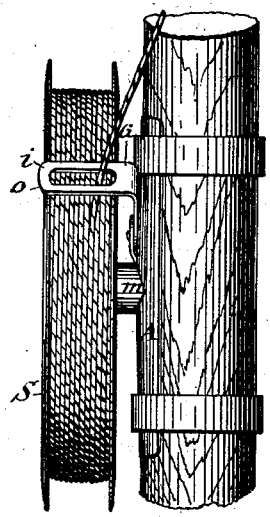
FIG-1-
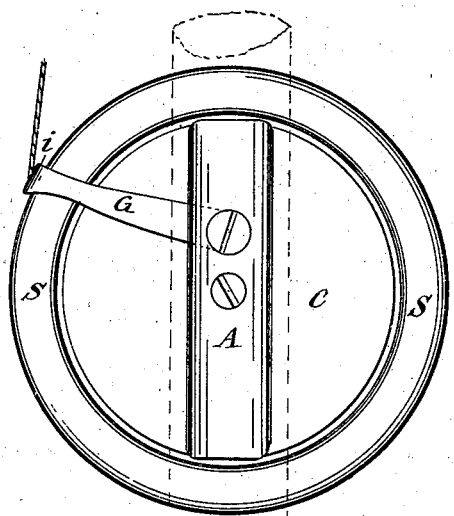
FIG-2-
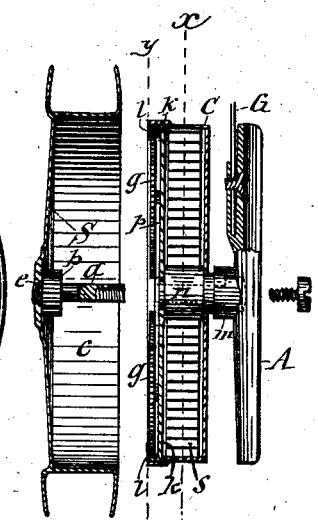
FIG-3-
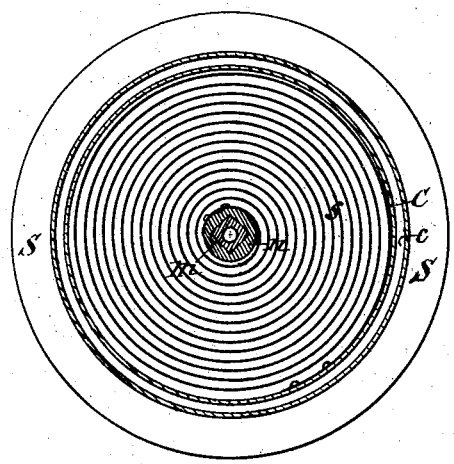
FIG-4-
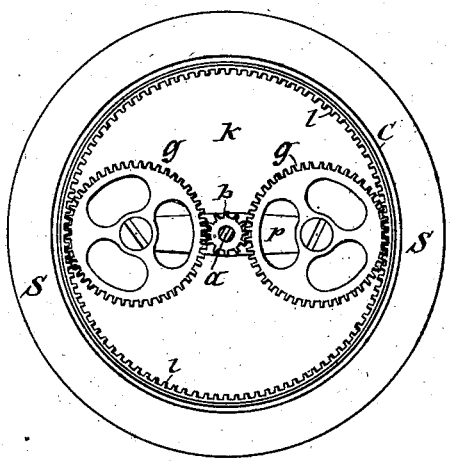
FIG-5-
WITNESSES—
C. H. Duell
Wm. O. Raymond
INVENTOR—
Franklin R. Smith (No Model.) 2 Sheets—Sheet 2.
F. R. SMITH.
FISHERMAN'S REEL.
No. 259,935. Patented June 20, 1882.
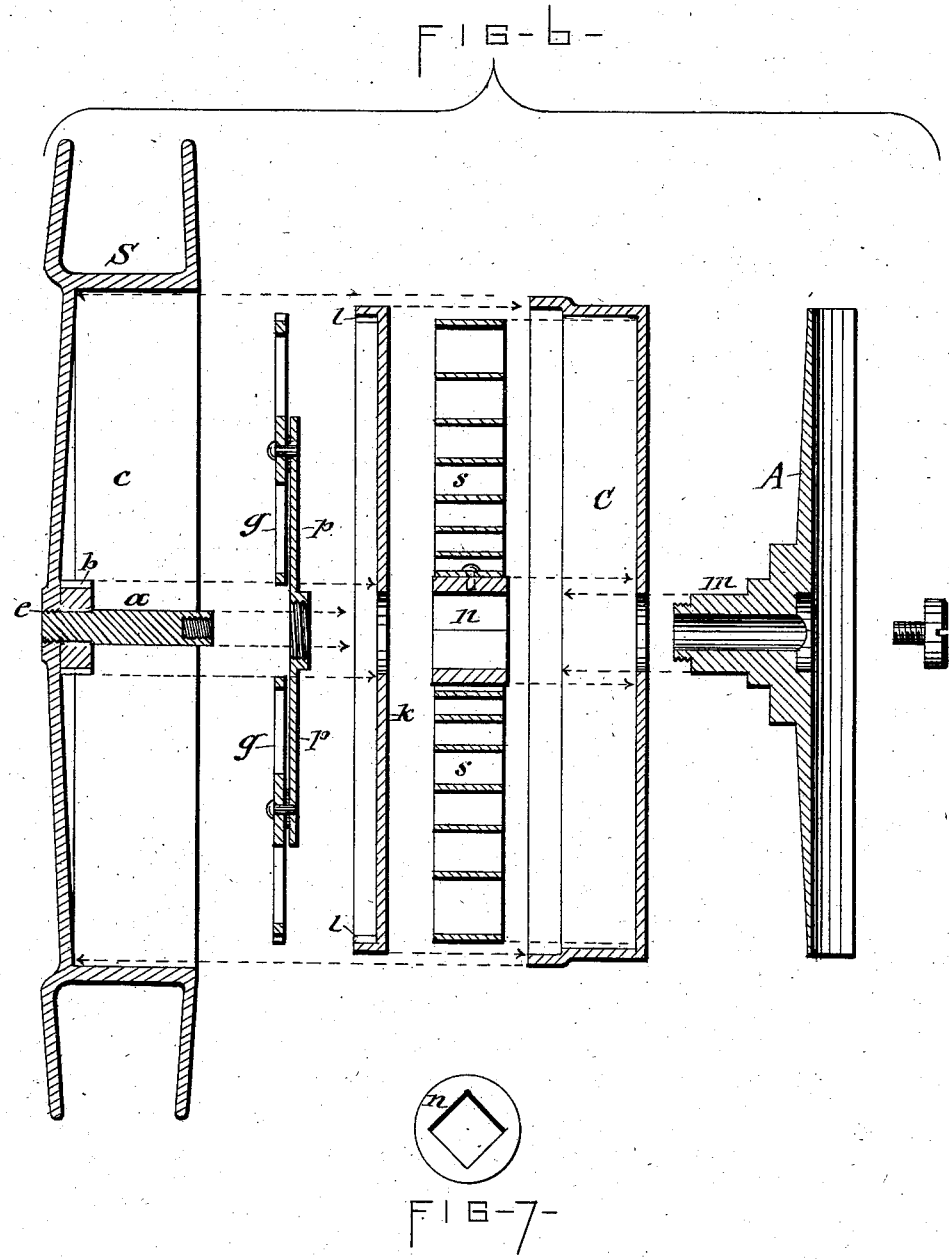
Witnesses —
Inventor —

UNITED STATES PATENT OFFICE.

FRANKLIN R. SMITH, OF SYRACUSE, NEW YORK, ASSIGNOR OF ONE-HALF TO WILLIS S. BARNUM, OF SAME PLACE.

FISHERMAN'S REEL.

SPECIFICATION forming part of Letters Patent No. 259,935, dated June 20, 1882.

Application filed February 13, 1882. (No model.)

*To all whom it may concern:*

Be it known that I, FRANKLIN R. SMITH, of Syracuse, in the county of Onondaga, in the State of New York, have invented new and useful Improvements in Fishermen's Reels, of which the following, taken in connection with the accompanying drawings, is a full, clear, and exact description.

This invention relates to improvements in that class of fishermen's reels in which the spool is caused to automatically wind up the line by the medium of spring-actuated gearings connected with said spool, and has more particular reference to the reel for which I obtained Letters Patent No. 244,828, dated July 26, 1881.

The invention consists, first, in detachably connecting the line-spool with its actuating mechanism, so as to admit of readily interchanging spools provided with lines specially adapted for the different species of fish to be caught; secondly, in a novel arrangement, with the spool, of the line-guide connected to the attaching-arm eccentrically in relation to the pivot of the spool, and having its free end extending across the periphery of the spool, and serving the additional function of a brake for limiting the movement of the spool; thirdly, in a novel construction of the line-guide, having a lateral inlet to the eye thereof for the introduction and removal of the line to and from the said eye; fourthly, in the combination, with the case inclosing the spring, of a plate secured to the free edge of the case and provided with concentric gearing, said plate serving to close the case, so as to effectually exclude dust and water from said case and the inclosed spring, and also affording an additional axial bearing for the case, and thus more effectually preventing lateral vibration of same; fifthly, in the combination, with the spool, of an attaching-plate provided with a square or polygonal post, a collar fitted to said post, and the spring connected to said collar, thereby greatly facilitating the attachment and removal of the spring when desired, all as hereinafter fully described, and specifically set forth in the claims.

In the annexed drawings, Figure 1 is an edge view of the improved reel attached to the fishing-rod. Fig. 2 is a rear face view of the reel detached from the rod, the latter being indicated by dotted lines. Fig. 3 is a vertical transverse section of the spool and its actuating mechanism. Fig. 4 is a section on line $x\,x$. Fig. 5 is a section on line $y\,y$. Fig. 6 is an enlarged vertical transverse section of the constituent parts of my improved fishermen's reel detached from each other, and Fig. 7 is an end view of the collar by which the inner end of the spring is secured to the stationary post of the attaching-plate.

Similar letters or references indicate corresponding parts.

A is the attaching-plate by means of which the reel is attached to the fishing-rod, said plate having projecting from its outer face a post, $m$, the base of which is in the form of a circular collar, upon which is pivoted the case C, said case consisting of a circular disk provided with a wide flange on its periphery. At the interior of said case the post $m$ is made square or polygonal in form. Upon this portion of the post is fitted the collar $n$, to the exterior of which is attached one end of the coiled spring $s$, the opposite end of said spring being attached to the periphery of the case aforesaid. Over this spring is placed a circular plate, K, fitted to the interior of the free edge of the case C, and completely closing the case and covering the spring $s$, so as to effectually prevent its lateral vibration and exclude dust and water from the case. The plate K, which is firmly secured to the periphery of the case C so as to move with it, is also provided with a proper journal-bearing on the post $m$, on which said case is journaled, and thus affords an additional axial support for the case and prevents lateral vibrations of the same. The edge of the plate is provided on its outer side with a concentric gearing, $l$, as best seen in Fig. 5 of the drawings. The post $m$ of the attaching-plate protrudes through the plate $k$, and upon the outer end thereof is secured a transverse bar, $p$, on which bar $p$ are pivoted two gears, $g\,g$, which gears mesh in the gearing $l$ of the plate $k$.

S is the spool upon which the fishing-line is wound, said spool having on one side a concentric cavity, $c$, which is of such dimensions as to receive the case C and bring the back of said case flush with the back of the spool. In the center of the cavity c the spool S is provided with a screw-threaded eye, e, in which is screwed the stud a, by which latter the spool is secured to the post which carries the actuating mechanism, as hereinafter described. The aforesaid screw-connection of the spool and the stud a admits of a ready attachment and detachment of the spool and of the interchangement of spools provided with different grades of fishing-lines, according to the fish to be caught. The threads of the screw by which the spool is attached to the stud a run conversely from those of the screw which connects said stud with the post m, thus preventing the spool from becoming detached when subjected to a draft on the line. The stud a of the spool passes through an axial hole in the post m of the attaching-plate, and has its extremity provided with a female-threaded socket, which is engaged by a screw inserted from the back of the attaching-plate, thereby securely uniting the spool with the case and attaching-plate aforesaid. To the base of the stud a is secured a small pinion, b, which engages with the gears g g on the cross-bar before described. The spring within the case is wound in such a direction as to transmit to the spool a movement diverse from the direction in which the line is wound upon said spool, said movement being transmitted by the gears before described.

G denotes the line-guide, consisting of an arm pivoted to the attaching-plate eccentrically relative to the pivot of the spool, the free end of said arm being extended across the periphery of the spool, and provided in its projecting portion with an eye, i, through which the fishing-line passes.

In order to facilitate the attachment and detachment of the line to and from the spool, I provide the said eye with a lateral inlet, o, for the line p, said inlet being guarded by being normally held in a closed condition.

By pivoting the line-guide eccentrically in the manner before described the free end thereof can be drawn down upon the periphery of the spool, and thus made to serve as a brake to the action of the spool and control the motion of the same at the option of the operator.

Having described my invention, what I claim as new, and desire to secure by Letters Patent, is—

1. In combination with the tubular post m, the stud a, provided with a female-threaded socket at one end and with external screw-threads at the opposite end, the interchangeable spool S, provided with a screw-threaded eye, e, for the reception of the externally-threaded end of the stud a, and the attaching-screw fitted to the cavity in the opposite end of the stud a, all as shown and described, for the purpose set forth.

2. In combination with the attaching-plate A and the spool S, pivoted thereon as shown, the combined line-guide and brake, consisting of an arm, B, pivoted on the attaching-plate in eccentric relation to the pivot of the spool, and having its free end extended across the periphery of the spool and provided with an eye, i, the whole constructed and operating to control the motion of the spool and guide the line, substantially as set forth.

3. In combination with the spool S, the line-guide having a guarded lateral inlet, o, to the eye thereof, for the introduction and removal of the line to and from said eye, substantially as set forth.

4. The combination, with the pivoted spring-case C, of the geared plate K, rigidly attached to and closing the case, and provided with an axial bearing, substantially as described, for the purpose specified.

5. In combination with the spool S and case C, the post m, having inside of said case a square or polygonal form externally, the collar n, fitted detachably to the exterior of said post, and the spring s, connected at its inner end to the collar n, substantially as and for the purpose shown and set forth.

In testimony whereof I have hereunto signed my name and affixed my seal, in the presence of two attesting witnesses, at Syracuse, in the county of Onondaga, in the State of New York, this 1st day of February, 1882.

FRANKLIN R. SMITH. [L. S.]

Witnesses:
 WM. C. RAYMOND,
 C. H. DUELL.